United States Patent [19]

Marino et al.

[11] Patent Number: 4,603,325
[45] Date of Patent: Jul. 29, 1986

[54] EVALUATION APPARATUS

[75] Inventors: Francis C. Marino, Dix Hills; Douglas McGarrett, Jamaica, both of N.Y.

[73] Assignee: Pittway Corporation, Syosset, N.Y.

[21] Appl. No.: 617,494

[22] Filed: Jun. 5, 1984

[51] Int. Cl.⁴ .......................... G08B 1/08; H04B 17/00
[52] U.S. Cl. .................... 340/539; 340/514; 340/515; 340/531; 455/9; 455/67; 455/154; 455/226; 343/6.5 R
[58] Field of Search ............... 340/539, 531, 537, 505, 340/506, 511, 514, 345, 346, 515, 825.54, 825.69, 825.72; 455/7, 9, 10, 11, 53, 67, 115, 154, 157, 159, 226, 227; 343/6.5 R, 6.5 SS, 6.8 R

[56] References Cited

U.S. PATENT DOCUMENTS

| | | | |
|---|---|---|---|
| 3,435,444 | 3/1969 | Kuhn | 340/539 |
| 3,768,018 | 10/1973 | Deming | 340/696 |
| 3,882,399 | 5/1975 | Karpowycz et al. | 455/157 |
| 3,925,763 | 12/1975 | Wadhwani et al. | 340/539 |
| 4,024,519 | 5/1977 | Galvin | 340/514 |
| 4,032,909 | 6/1977 | Boyce | 340/514 |
| 4,040,719 | 8/1977 | Schiebelhuth | 455/157 |
| 4,348,666 | 9/1982 | Ogita | 455/159 |
| 4,361,904 | 11/1982 | Matsumura | 455/115 |
| 4,491,968 | 1/1985 | Shimp et al. | 455/9 |
| 4,506,332 | 3/1985 | Bloch et al. | 455/226 |

FOREIGN PATENT DOCUMENTS 0069470  1/1983  European Pat. Off. .

Primary Examiner—Donnie L. Crosland

[57] ABSTRACT

The invention provides apparatus for evaluating installation of components of a wireless type of alarm system or the like that includes a plurality of satellite stations, each of which includes a sensor and associated transmitter circuitry responsive to the sensor for transmitting an alarm signal at radio frequency, and a central station for receiving the alarm signal and operating an output device in response to the received signal. The installation evaluating apparatus includes signal strength sensing circuitry responsive to the strength of the alarm signal received at the central station, and an RF transmitter responsive to the sensed signal strength for transmitting an indicator signal to a receiver at the installation location of the satellite transmitter device being evaluated, the nature of the indicator signal received at the transmitter site providing an indication of the quality of the RF transmission path between the transmitter and the central receiver.

11 Claims, 3 Drawing Figures

EVALUATION APPARATUS

This invention relates to security systems and the like, and more particularly to methods and apparatus for evaluating installations of components of such systems.

Typical security systems include a central monitoring station and a plurality of satellite monitoring devices, for example, sensors, heat sensors, window sensors, intrusion sensors, that monitor sensitive location within a general area of surveillance. When that surveillance area comprises a large building, or even an entire complex, the monitoring devices may be located at substantial distances from one another and from the central station or panel.

In security systems, it is frequently desirable to transmit signals warning against impending danger from the satellite monitoring devices to a central monitoring station or panel. For example, a house security system may monitor a plurality of satellite sensors which can generate signals indicating alarm conditions (for example smoke, fire, unauthorized entry through a door or window, loss of power, etc.). A change of state of a sensor causes an associated satellite transmitter to generate an alarm signal identifying the sensor and the type of condition producing the alarm signal. The central station receives and decodes the signal transmitted from the satellite sensor-transmitter unit, and generates an output signal which alerts the system operator to the occurrence of the alarm condition, for example by displaying information which identifies the remote sensor signaling the alarm condition and the type of alarm condition indicated by that remote sensor. Security systems of this type may be of the wire or wireless type.

Advantages of the wireless type over the wire type system include reductions in both complexity and cost of installation. However, wireless system advantages can be offset by improper location of the satellite transmitter devices relative to the central station receiver, as RF (radio frequency) signals are both absorbed and reflected by materials of a type commonly used in building constructions. Also, large metallic objects such as refrigerators, washing machines, clothes dryers, air conditioners, hot and cold air duct work, etc., will reflect or alter the otherwise direct RF signal path between the satellite transmitter and the central receiver. An unskilled installer can easily install a transmitting device in a location that results in marginal or distorted signal transmission path to the central receiver. The reduced complexity of installation of wireless systems has attracted relatively unskilled personnel into the security system installation market, and particularly that segment of the market providing fire, burglary and/or personal emergency protection for the home owner. Where a satellite transmitter device is located in a marginal signal transmission path, the device may appear to be communicating well with the central receiver at the time of installation, but the communication may fail when temperature and humidity conditions change the transmission or reception characteristics of a system device within its specified tolerances.

In accordance with the invention, there is provided apparatus for evaluating installation of components of a wireless type of alarm system or the like that includes a plurality of satellite stations, each of which includes a sensor and associated transmitter circuitry responsive to the sensor for transmitting an alarm signal at radio frequency, and a central station for receiving the alarm signal and operating an output device in response to the received signal, the installation evaluating apparatus including signal strength sensing circuitry responsive to the strength of the alarm signal received at the central station, and an RF transmitter responsive to the sensed signal strength for transmitting an indicator signal to a receiver at the installation location of the satellite transmitter device being evaluated, the nature of the indicator signal received at the transmitter site providing an indication of the quality of the RF transmission path between the transmitter and the central receiver.

In a particular security system embodiment that employs UHF (345 MHz) transmitter and receiving equipment, the signal strength sensing circuitry includes amplitude peak detection circuitry, analog-to-digital converter circuitry that provides a digital signal corresponding to the strength of the received signal as sensed by the amplitude peak detection circuitry, and a shift register for storing the digital signal strength indications in binary form; an audio signal generating means includes an oscillator whose output pulses are applied as shift pulses to transfer stored information from the shift register in response to the termination of a transmission burst from the satellite transmitter as well as generating an audio indicator tone; and the RF transmitter is an FM transmitter that transmits at a broadcast frequency a series of audio tones corresponding in number to the digital value stored in the shift register.

The invention provides installation evaluation methods and apparatus which are easy to use and effective in identifying marginal transmission paths between a satellite transmitter and the central receiver of wireless type alarm systems and the like. The equipment and its use permit a single technically unskilled person to quickly and reliably position a transmitter component of a wireless security system at an effective RF transmission location.

The equipment of the invention includes a field strength sensor coupled to the central receiver that cooperates with a transmitter tuned to a particular FM frequency, in a compact oscillator/amplifier transmitter arrangement.

Other features and advantages of the invention will be seen as the following description of a particular embodiment progresses, in conjunction with the drawings, in which.

DESCRIPTION OF PARTICULAR EMBODIMENT

Figure 1:
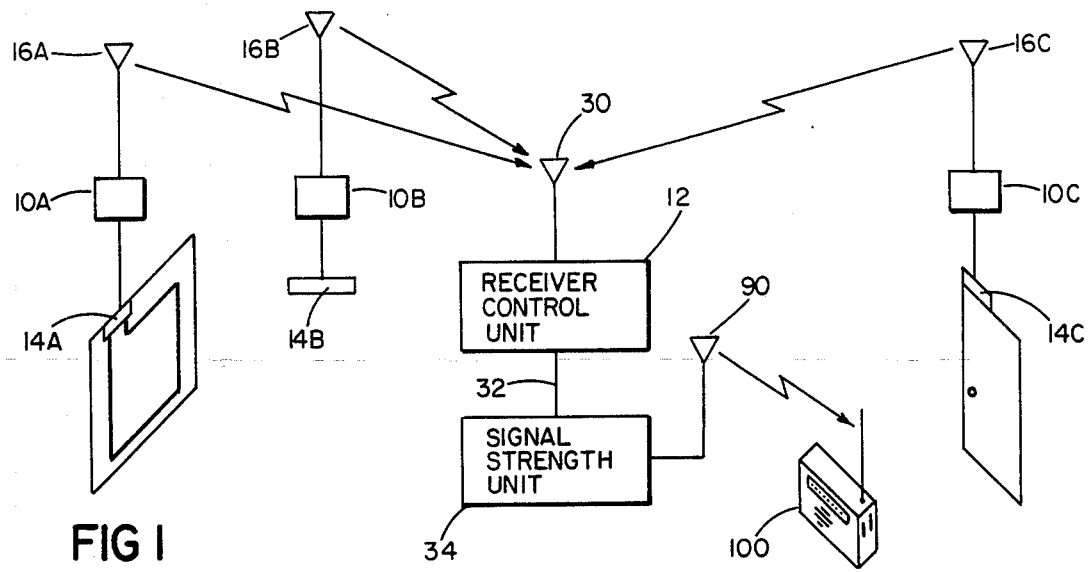
FIG. 1 is a block diagram of a wireless security system and installation evaluation equipment in accordance with the invention.
Figure 3:
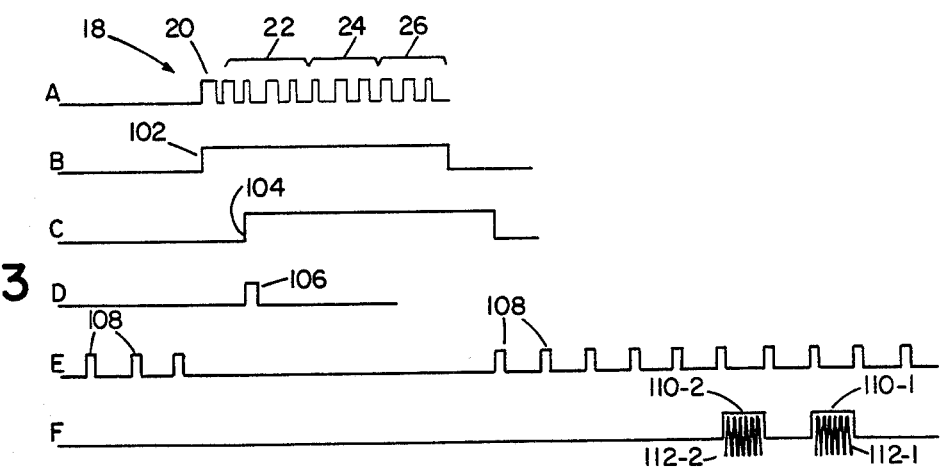
FIG. 3 is a timing diagram indicating aspects of the installation evaluation equipment shown in FIG. 2.

The security system shown in FIG. 1 includes a plurality of satellite transmitter units 10 and a central receiver-decoder unit 12, the transmitter units 10 and receiver-decoder units 12 being interconnected by high frequency (345 megahertz) radio links. Associated with each transmitter unit 10 is a security device 14 (for example, a window monitor 14A, an intrusion sensor 14B, a door monitor 14C) that is uniquely identified by a multi-bit device code. Each transmitter unit 10, in response to a trigger signal from its sensor 14, generates a serial train of signals in the form shown at 18 in FIG. 3a, including a sync pulse 20, a group 22 of system code pulses (to distinguish between its signal transmissions and signal transmissions from other security systems, each security system in a particular embodiment being arranged to monitor up to 32 security devices 14), a group 24 of sensor code pulses, and a group 26 of status pulses. The circuitry of transmitter 10 generates the serial train 18 of coded pulses which modulate a 345 megahertz signal from an RF oscillator with the resulting pulse width modulated RF signal being supplied to transmitter antenna 16.

The receiver decoder unit 12 includes antenna 30 that receives the RF signal and applies it to a decoder section which includes a demodulator where the received signal is demodulated to provide a received pulse code train 18 (FIG. 3) which is passed to a decoder in the control unit 12 which decodes the pulse train as a function of the width of each of the pulse signals (similar to the systems disclosed in copending U.S. patent application Ser. No. 525,967 and European Patent Publication No. 69,470, the disclosures of which are specifically incorporated herein by reference), and the decoded alarm signal is applied to appropriate output circuitry to indicate the existence and source of the alarm condition. The demodulated pulse train signal 18 is also applied over line 32 to signal strength-transmitter apparatus 34.

Figure 2:
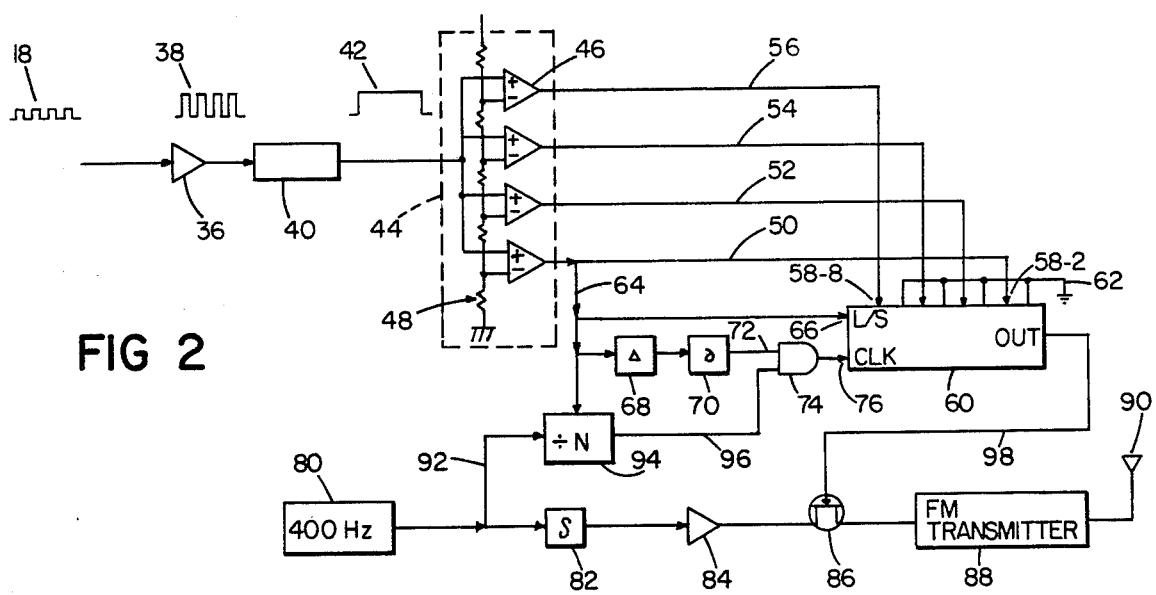
FIG. 2 is a block diagram of the installation evaluation equipment shown in FIG. 1.

Further details of apparatus 34 may be seen with reference to FIG. 2. That apparatus includes amplifier 36 which receives the demodulated code signal 18 on line 32 and produces an amplified signal 38 which is applied to signal strength sensor 40 which monitors the amplitude of the code pulses 38 and produces an output DC voltage level 42 proportional to the peak amplitude of the demodulated signal 18 (and corresponding to the strength of the RF signal received by antenna 30 of receiver 12). DC voltage level 42 is applied to analog-to-digital converter circuitry 44 which includes a set of comparator circuits 46, each of which has a reference input connected to a ladder network of resistors 48. Converter 44 provides four combinational logic level outputs 50, 52, 54, 56—output 50 representing a 'minimum margin' strength level of the received signal 18 that is six dB above the minimum sensitivity of receiver 12; output 52 representing a signal strength level three dB above the level represented by output 50; output 54 representing a signal strength level three dB above the level represented by output 52; and output 56 representing a signal strength level three dB above the signal strength level represented by level output 54. In terms of margin, measured in decibels above the minimum sensitivity level of the RF amplifier of receiver-decoder 12:
output 50—+6 dB margin;
output 52—+9 dB margin;
output 54—+12 dB margin;
output 56—+15 dB margin.
It will be apparent that the signal strength levels represented by outputs 50-56 may be set to other values as appropriate for the particular communication system, and similarly another number of output levels may be appropriate for easy discernment by the installer.

The four outputs 50-56 of converter 44 are applied as parallel inputs to corresponding inputs 58 of eight bit shift register 60, such that a 50% duty cycle output will be provided as stored information is subsequently shifted out of register 60. The four information signals 50-56 are loaded into even bit stores 58-2, 58-4, 58-6 and 58-8 respectively, while the odd bit stores of shift register 60 are forced to logic zero level by ground connection 62. It will be apparent that other duty cycles may be used. A typical duration of a code signal transmission 18 from a transmitter 10 is in the range of 50 to 400 milliseconds, depending on the type and length of the encoded message. Each signal "burst" 18 from a transmitter 10 is not repeated more frequently than once every two seconds during a "test" mode of operation, and considerably less frequently when the system is in actual use. The minimum margin signal output 50 from converter 44 is also applied over line 64 to control input 66 of shift register 60; through delay circuit 68 and differentiator circuit 70 to input 72 of OR circuit 74 to the clock input 76 of shift register 60; and as an inhibit input to divider circuit 94.

Free running square wave oscillator 80 serves as an audio frequency tone generator and as the main clock of the signal strength storage circuitry. The output of oscillator 80 is passed through low pass filter 82, amplifier 84 and FET analog switch 86 to FM transmitter 88. Transmitter 88 is tuned to a standard predetermined FM broadcast frequency (which may be selected by the installer, if desired) and normally applies that carrier frequency to transmitting antenna 90. The output of oscillator 80 is also applied over line 92 to divider circuit 94 which produces a single pulse outlet on line 96 in response to every "N" pulses from oscillator 80. Where the fundamental frequency of oscillator 80 is 400 hertz, divide by 100 circuit 94, for example, produces an output pulse on line 96 every 250 milliseconds. The output pulses on line 96 are applied through OR circuit 74 as shift pulses for shift register 60 to gate audio tones from oscillator 80 that modulate the FM carrier and are received by portable FM radio 100 (of a commercially available type, for example) that is located at the site of the satellite transmitter system 10C being evaluated.

In the quiescent state (no RF signal of 'minimum margin' strength being received by receiver-control unit 12) all of the outputs 50-56 of converter 44 are at logic zero, and the outputs on line 98 from shift register 60 are not gating outputs so that switch 86 blocks audio tone transmission to FM transmitter 88. During such intervals, FM carrier is transmitted from antenna 90 and received by portable FM radio 100, but no audible tones are heard by the installer.

When the installer is testing the location of antenna 16C, he triggers sensor 14C to produce an alarm signal. Transmitter 10C transmits the resulting signal burst 18 which is received by antenna 30, demodulated and decoded with the demodulated signal being applied over line 32 to the signal strength-transmitter unit 34. If the signal received by signal strength sensor 40 exceeds the 'minimum margin' level (at least 6 dB above the minimum signal sensitivity in this embodiment) converter 44 generates an output signal 102 (FIG. 3) on line 50 which inhibits clock pulses 108 (FIG. 3) from divider circuit 94, switches shift register 60 to load condition, and is applied through delay circuit 68 (to produce signal 104—FIG. 3C) and differentiator circuit 70 to produce pulse 106 (FIG. 3D) which is applied through OR circuit 74 to load the strength level signals (on lines 50-56) into corresponding stages of shift register 60.

At the end of the transmitted code "burst" 18, output 42 terminates and all of the outputs of converter 44 return to logic zero level (including signal 102 on line 64), returning shift register 60 to shift mode and removing the inhibit on divider 94. Divider 94 then resumes the application of shift pulses 108 on line 96 which are applied through OR circuit 74 to shift the received signal strength data signal contents of shift register 60 over output 98 as gating intervals 110 corresponding to the contents of the output stage of shift register 60. Each shift register output signal 110 is applied to switch 86 to gate a 400 hertz audio signal pulse 112 from amplifier 84 to FM transmitter 88 where it modulates the FM carrier and the resulting modulated FM signal is applied to antenna 90 and transmitted to receiver 100.

If the RF signal from transmitter 10C received by antenna 30 and central unit 12 was of marginal strength (level 1 amplitude), a single audio burst 112-1 would be transmitted and received by the installer's FM receiver 100. Similarly, if the received RF signal strength was of level 2 amplitude (outputs on lines 50 and 52), two audio bursts 112-1, 112-2 (FIG. 3) would be transmitted and heard by the installer.

Thus, if the installer hears one or more of the unique 400 hertz tones of oscillator 80 on his radio receiver 100 in response to activation of door sensor 14C, he can evaluate the quality of the transmission path between antenna 16c and central station antenna 30 depending on the number of "bursts" that he hears. If there is no audio sound or an inadequate number of bursts 112 are heard, the installer relocates antenna 16C to provide a more effective and reliable RF energy transmission path and repeats the test. Thus, the apparatus permits a single, technically unskilled person to install the transmitter devices 10 and suitably locate their antennas 16 and to verify that reliable RF transmission paths exist between each sensor-transmitter installation and the central receiver, independent of that installer's knowledge and skill concerning construction materials and other influences on RF transmission characteristics in the protected premises.

While a particular embodiment of the invention has been shown and described, various modifications will be apparent to those skilled in the art. For example, other indicator transmission frequencies may be utilized, the installer's receiver need not be tunable. Therefore it is not intended that the invention be limited to the disclosed embodiment or to details thereof, and departures may be made therefrom within the spirit and scope of the invention.

What is claimed is:

1. Apparatus for evaluating installation of components of a wireless type of alarm system or the like that includes a plurality of satellite stations, each of which includes a sensor and associated transmitter circuitry responsive to the sensor for transmitting an alarm signal at radio frequency, and a central station remote from said satelite stations for receiving the alarm signal and operating an output device in response to the received signal, the installation evaluating apparatus including signal strength sensing circuitry responsive to the strength of the alarm signal received at said central station, and an RF transmitter responsive to said sensed signal strength for transmitting an indicator signal to a receiver at the installation location of the satellite transmitter device being evaluated, the nature of said indicator signal received at said transmitter site providing an indication of the quality of the RF transmission path between said transmitter and said central receiver.

2. The apparatus of claim 1 wherein said signal strength sensing circuitry includes amplitude peak detection circuitry, and analog-to-digital converter circuitry having a set of outputs and providing a digital signal corresponding to the strength of the received signal as sensed by said amplitude peak detection circuitry.

3. The apparatus of claim 2 wherein said converter circuitry includes a plurality of comparator circuits and a resistive ladder network.

4. The apparatus of claim 1 and further including audio signal generating means comprising an oscillator, and said RF transmitter transmits an audio frequency modulated signal at a broadcast frequency as said indicator signal.

5. The apparatus of claim 1 and further including means for storing said signal strength indication in binary form.

6. The apparatus of claim 5 and further including an audio frequency oscillator, gate means for controlling application of audio frequency signals to said RF transmitter, and divider circuitry responsive to said audio frequency signals, and second gate means for controlling application of output signals from said divider circuitry to said signal strength storage means.

7. The apparatus of claim 5 wherein said signal strength storage means includes a shift register, and further including an oscillator and means for applying output pulses of said oscillator as shift pulses to transfer stored information from said shift register.

8. The apparatus of claim 1 and further including means responsive to the termination of a transmission burst from said satellite transmitter for causing said RF transmitter to transmit a series of audio tone indicator signals corresponding in number to the received strength of said transmission burst.

9. Apparatus for evaluating installation of components of a wireless type of alarm system or the like that includes a plurality of satellite stations, each of which includes a sensor and associated transmitter circuitry responsive to the sensor for transmitting an alarm signal at radio frequency, and a central station remote from said satellite stations for receiving the alarm signal and operating an output device in response to the received signal, the installation evaluating apparatus including
signal strength sensing circuitry responsive to the strength of the alarm signal received at said central station, said signal strength sensing circuitry including amplitude peak detection circuitry, and analog-to-digital converter circuitry having a plurality of outputs, each said output providing a digital signal corresponding to the strength of the received signal as sensed by said amplitude peak detection circuitry,
an RF transmitter, and
means responsive to the termination of a transmission burst from said satellite transmitter for causing said RF transmitter to transmit a series of audio tone indicator signals corresponding in number to the digital signal output of said analog-to-digital converter circuitry to a receiver at the installation location of the satellite transmitter device being evaluated, the number of said audio tone indicator signals received at said the transmitter site providing an indication of the quality of the RF transmission path between said transmitter and said central receiver.

10. The apparatus of claim 9 wherein said converter circuitry includes a plurality of comparator circuits and a resistive ladder network.

11. The apparatus of claim 10 and further including shift register means for storing said signal strength indication in binary form, an oscillator, and means for applying output pulses of said oscillator as shift pulses to transfer stored information from said shift register for controlling the generation of said audio tone indicator signals.

* * * * *